Figure 1:
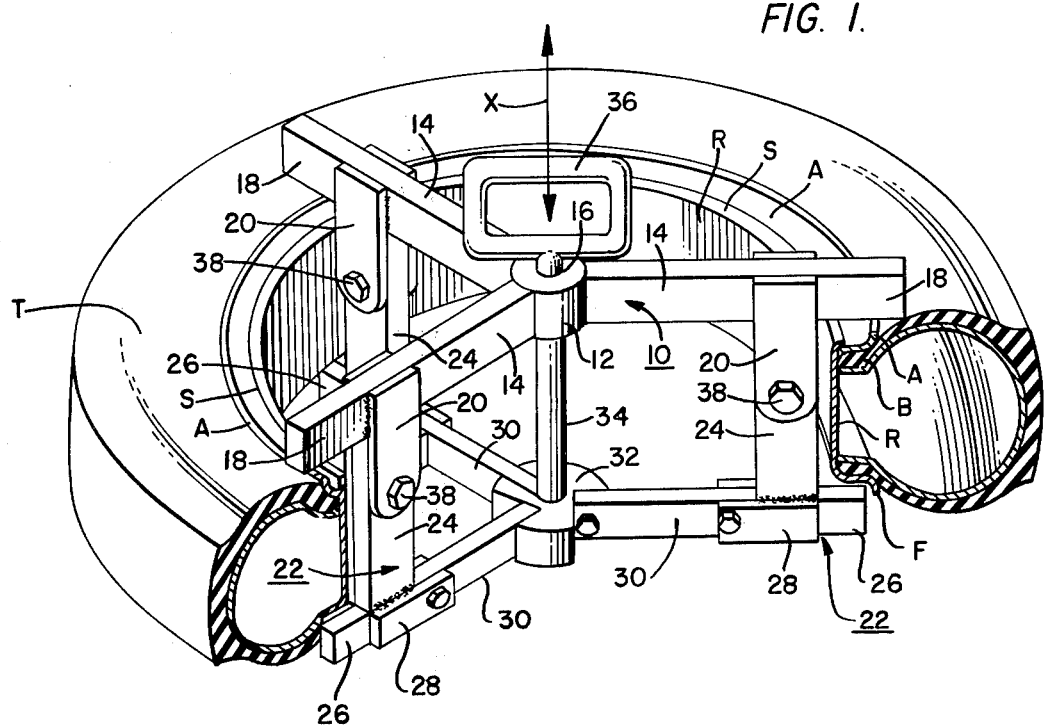

United States Patent [19]

Halfacre

[11] 4,147,195
[45] Apr. 3, 1979

[54] TRUCK TIRE SAFETY CLAMP

[76] Inventor: Dell V. Halfacre, Manila, Ark. 72442

[21] Appl. No.: 859,891

[22] Filed: Dec. 12, 1977

[51] Int. Cl.² .............................................. B60C 25/00
[52] U.S. Cl. ...................................................... 157/1
[58] Field of Search .................. 144/288 A; 157/1, 1.1

[56] References Cited
U.S. PATENT DOCUMENTS

| | | | |
|---|---|---|---|
| 2,476,209 | 7/1949 | Monheit | 157/1 |
| 2,710,054 | 6/1955 | Merriman | 157/1 |
| 2,835,318 | 5/1958 | Conger | 157/1 |
| 2,881,825 | 4/1959 | Engstrom | 157/1 |
| 3,949,794 | 4/1976 | Marshall | 144/288 A |
| 4,036,274 | 7/1977 | Peel, Sr. | 157/1 |

Primary Examiner—James L. Jones, Jr.
Assistant Examiner—James G. Smith
Attorney, Agent, or Firm—Dowell & Dowell

[57] ABSTRACT

A safety clamp to be locked onto a rim while a tire is being mounted and inflated thereon using a retaining ring, the safety clamp having a rigid frame with peripheral portions overlying the rim and ring assembly and the tire, and the frame supporting plural locking members which are expanded to underlie the rim and the tire bead and lock the clamp thereto when a central rod is lowered, but the locking members being retracted when the central rod is raised thereby to release the safety clamp and permit its removal.

7 Claims, 2 Drawing Figures

U.S. Patent   Apr. 3, 1979   4,147,195

TRUCK TIRE SAFETY CLAMP

FIELD OF INVENTION

This invention relates to a safety clamp to be applied to a rim and tire assembly while the tire is being mounted on the rim and inflated, and more particularly, relates to an improved safety clamp which can be quickly and easily applied to such an assembly to protect workmen if the tire should blow off of the rim.

BACKGROUND AND PRIOR ART

It is well recognized that the mounting of large truck and bus tires on a rim using one or more separate retaining rings, referred to as side rings or locking rings, is a hazzardous operation which can result in personal injury or death to nearby personnel if the tire bead and retaining ring should be blown off of the rim during inflation of the tire. This occasionally happens when a retaining ring is inaccurately engaged with the annular flange carried by the rim to engage and lock one side of the retaining ring while the tire bead is being forced by inflation against the other side of the ring.

The prior art provides a number of different safety clamps intended to confine the tire and retaining ring parts in the event of an explosive blowing out of the assembly, but many of these clamps are time consuming and/or awkward to apply and remove with the result that workmen tend to avoid their use, thereby assuming unnecessary risks.

U.S. Pat. No. 2,476,209 to Monheit shows a clamp which is effective, but which is cumbersome and slow to apply since its application or removal requires the manual manipulation of multiple screws.

U.S. Pat. Nos. 2,710,054 to Merriman and 2,881,825 to Engstrom show effective clamps, but these clamps are awkward to apply, requiring a certain amount of manual dexterity and requiring the use of both hands to spread the legs of the clamp and fit the locking pin a hole.

U.S. Pat. No. 2,835,318 to Conger is a simple structure, but it requires lifting of the tire assembly off the ground to place part of the clamp beneath the tire, followed by fitting the other part on top of the assembly, a time consuming operation.

THE INVENTION

The present invention provides a safety clamp comprising an upper rigid frame having radially extending peripheral portions projecting outwardly from a central hub to overlie annularly spaced points of the wheel rim and retaining ring assembly and the bead of the tire and rest thereagainst. One locking member is pivotally supported at the top of its upwardly extending arm relative to each peripheral portion of the frame. The locking members each have an outwardly facing lug which can underlie the wheel rim and the bead of the tire beneath one of said peripheral portions of the frame and respectively lie directly therebeneath. The respective locking members can each be pivoted between a retracted position in which it is pulled radially inwardly to facilitate insertion of the safety clamp into a rim and tire assembly, and an extended or locked position in which it is pivoted radially outwardly so that its lug underlies the rim and tire bead. The pivotal movements of the locking members between these two positions are accomplished simultaneously by the raising and lowering of a rod which has a handle at its upper end and which extends downwardly through a bore in the central hub of the frame and carries a cross-head at its lower end. The cross-head is connected to the respective locking members by connecting links, whereby when the rod and cross-head are raised with respect to the hub and frame the locking members are retracted, and when the rod and cross-head are lowered with respect to the hub and frame until the handle stops against the hub, the locking members are radially extended into locked position.

It is a principal object of the invention to provide an effective safety clamp which when picked up by its central handle automatically unlocks from the rim and tire assembly for removal, and which when set down with its handle pushed downwardly, either manually or by gravity, automatically moves into extended position and locks onto the rim and tire assembly.

It is another principal object of the invention to provide a safety clamp in which the locking member is retracted and extended by a toggle-type linkage assembly wherein the cross-head, the connecting links and the lugs which contact the rim and tire assembly all lie in a common plane in the locked position of the safety clamp so that forces applied to the safety clamp as a result of a blow-out of the tire bead from the rim have no tendency to unlock the safety clamp, because any forces that tend to pivot the locking members inwardly are translated into compressive forces in the connecting links which forces are mutually opposed in a common plane and applied to the cross-head where they cancel out.

A further important object of the invention is to provide a safety clamp in which the positions of the arms of the locking members by which they are pivotally connected to the frame are oriented normal to the plane of the frame and to the lugs, and the arms join the lugs very close to the tire rim when the locking members are in the extended or locked positions, whereby in case of a blow-out of the tire bead from the rim, the major component of the forces applied to each arm is a tensile force along the arm rather than a force attempting to rotate the arm about its pivotal mounting to the frame.

It is a further object of the invention to provide a safety clamp in which downward extensions are mounted near the outer periphery of the rigid frame, the upper ends of the arms of the locking members being pivoted to these extensions. By this means, the main pivot for each of the locking members has been moved to a point intermediate the frame and the lug as measured in the axial direction, whereby when the clamp is moved into its retracted position, the lug pivots very quickly out of contact with lower rim and bead assembly because the length of the arm from the lug to the pivot is short, and therefore the movement of the cross-head and connecting link causes the locking member to pivot through a relatively larger angle than would be the case if the distance from the lug to the pivot were larger.

Other objects and advantages of the invention will become apparent during the following discussion of the drawing:

THE DRAWING

Figure 2:
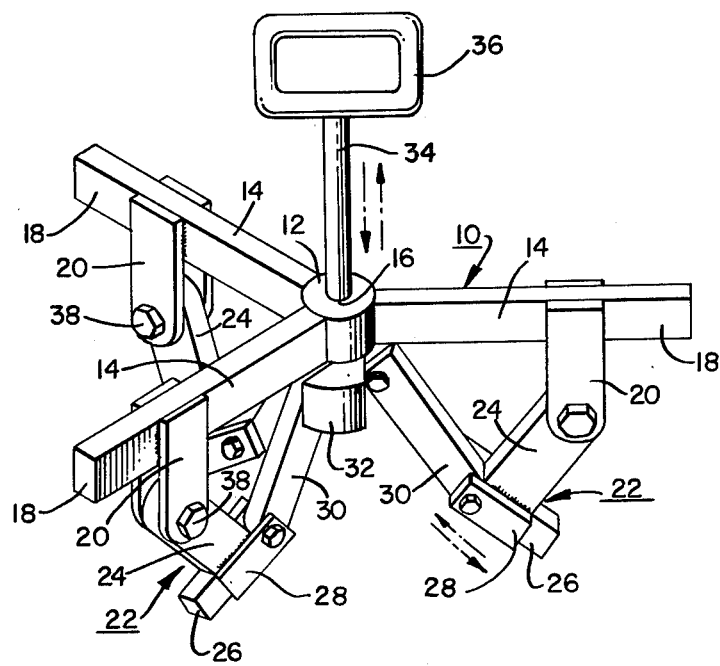

FIG. 1 is a perspective view, partly in cross-section showing a safety clamp according to the invention, which clamp is mounted in locked position on a rim and tire assembly; and FIG. 2 is a perspective view of the safety clamp removed from the rim and tire assembly and in unlocked position.

Referring now to the drawings, FIG. 1 shows a vehicle tire T having two bead portions B which are mounted on a conventional rim R, which is intended to be mounted on a vehicle wheel (not shown). The rim has a fixed retaining ring F on one side and a small flange S on the other side which is used to captivate removable retaining ring means A of conventional type. It is to be understood that this composite rim assembly can include either one removable retaining ring A on one side of the rim or two such rings on opposite sides, for instance as shown in U.S. Pat. No. 2,476,209, supra.

The safety clamp according to this invention is shown in its extended or locked position in FIG. 1, and in its unlocked retracted position in FIG. 2. The clamp comprises a frame 10 including a hub 12 and a rigid frame portion which in the present illustrative embodiment comprises two or more frame legs 14. Three legs are shown in the drawing. The frame legs are fixed at their inner ends to the hub 12 which has a bore 16 through it. The outer ends 18 of the legs overlie the rim assembly comprising the rim R and the retaining ring A as well as the bead B of the tire. It is to be understood that the frame need not comprise legs 14 and 18, but could be a solid disc of metal in another alternative form. Whether a disc or legs are used, either form would provide peripheral portions 18 which lie in a first plane and overlie the rim assembly and the tire bead and rest upon it. In addition, the frame 10 carries downward extensions 20 which in the illustrated embodiment comprise metal strips welded to both sides of the legs and extending downwardly parallel to the axis X of the safety clamp.

The safety clamp further comprises multiple locking members generally referred to by the reference character 22, which locking members each comprises an upwardly extending arm 24, a lug 26 extending radially outwardly from the lower end of the arm 24, and a pair of straps 28 welded on each side of the arm and leaving a space between them to receive the outer end of a connecting link 30 which is pivotally connected at its inner end to a cross-head member 32, which is carried by a rod 34 extending through the bore 16 in the hub 12 and terminating in a handle 36. The handle 36 serves as a stop means to limit the downward movement of the rod 34 through the bore 16 in the hub 12, for the purpose hereinafter stated.

Since the various parts of the safety clamp repeat in the several annularly spaced locations around the safety clamp, similar reference characters have been used to designate similar parts in the assembly.

Each of the locking members 22 is connected by a main pivot bolt 38 to a downward extension 20. The location of the pivot bolt 38 is intermediate between a lug 26 and an outer end 18 of a frame leg 14. In the illustrated embodiment, the pivot bolts 38 are approximately mid-way between the lugs 26 and the outer ends 18 of the frame legs, whereby the locking members will be tilted through a large angle when the handle 36 is raised to pull the rod 34 and the cross-head 32 upwardly into the retracted position of the safety clamp, shown in FIG. 2. On the other hand, it should be noted that when the safety clamp is in the locked position as shown in FIG. 1, the lugs 26, the connecting rods 30 and the cross-head 32 all occupy a second common substantially-horizontal plane, with the extensions 20 and arms 24 mutually aligned perpendicular to that horizontal plane. The extensions 20 and arms 24 are located adjacent to the inner periphery of the rim R. This geometry is such that in the event that the bead B of the tire and the retaining ring A are blown off of the rim by a pneumatic explosion, the safety clamp will remain in the locked position shown in FIG. 1, since there are no components of force acting in a direction to displace the rod 34 axially through the bore 16 of the hub 12.

This is a particularly rugged and easily manipulated safety clamp. It can be applied using only one hand by a workman who simply lowers it through the center of the rim and pushes the handle 36 down to install it, or pulls the handle 36 upwardly to move the parts into the retracted position shown in FIG. 2 in which the safety clamp can be easily raised from the center of the wheel for removal. Although the handle 36 and rod 34 can be reciprocated with virtually no effort, the force of a pneumatic explosion has no tendency to cause such reciprocation since all of the forces travel radially inwardly in a common plane to the cross-head 32 where they all cancel out.

The present invention is not to be limited to the exact form shown in the drawings, for obviously changes may be made within the scope of the following claims:

I claim:

1. A safety clamp to be locked to a tire and rim while the tire is being inflated on the rim, the tire having beads which are held on the rim by retaining ring means which are applied to the rim to form a composite rim assembly, the clamp comprising:

a fixed frame having a central hub with a bore extending through it in an axial direction, the frame extending outwardly from the hub above the rim assembly and the frame having peripheral portions lying in a first plane oriented normal to said axial direction and the peripheral portions being disposed to overlie one tire bead when the safety clamp is applied thereto;

multiple locking members each having an arm including a first end extending toward said frame, the arms being annularly spaced from each other and being pivotally connected to the frame respectively adjacent to said peripheral portions, and each arm having a second end supporting a lug which extends normal to the arm and away from the hub of the frame, each lug underlying the rim assembly and the other tire bead and lying in a second plane parallel to said first plane when the safety clamp is locked thereto;

a rod extending through the bore and carrying a cross-head located between said multiple locking members; and a connecting link connected between the cross-head and each locking member adjacent to the lug, the cross-head and connecting links and lugs all lying substantially in said second plane when the rod is moved to a locked position in which the lugs underlie the rim assembly and the other tire bead, and the rod having an unlocked position in which the cross-head is located adjacent to said hub and the connecting links retract the multiple locking members to pivot the arms and lugs thereof away from the tire and rim assembly.

2. In a safety clamp as set forth in claim 1, said rod having a stop means thereon which abuts said hub and stops the rod and cross-head in said locked position.

3. In a safety clamp as set forth in claim 1, said frame comprising multiple radially extending legs, each having an outer end comprising one of said peripheral portions and an inner end attached to the hub, and each of the arms of said locking members being pivotally coupled with a different one of said legs.

4. In a safety clamp as set forth in claim 3, said arms of the locking members being disposed substantially normal to said second plane when the clamp is in the locked position.

5. In a safety clamp as set forth in claim 4, said arms of the locking members being located immediately adjacent to the rim when the clamp is in the locked position.

6. In a safety clamp as set forth in claim 3, each leg of the frame having an extension fixed to the leg near its outer end and extending parallel to the axis toward a locking member, and each arm being pivotally connected to a corresponding extension, whereby each locking member is supported at the first end of its arm at a pivot point which is located intermediate its lug and the outer end of a corresponding leg of the frame.

7. In a safety clamp as set forth in claim 6, said pivot points each being located about half-way between a lug and the outer end of a corresponding leg of the frame as measured in said axial direction.

* * * * *